Sept. 25, 1962  W. H. W. SCHULLER ETAL  3,055,050
CONTINUOUS SPINNING OF GLASS OR LIKE
THERMOPLASTIC MASSES FROM RODS
Filed June 20, 1958

INVENTORS
WERNER H.W. SCHULLER
HEINZ KEIB
By
Morgan, Finnegan, Durham & Pine

United States Patent Office 3,055,050
Patented Sept. 25, 1962

3,055,050
CONTINUOUS SPINNING OF GLASS OR LIKE THERMOPLASTIC MASSES FROM RODS
Werner Hugo Wilhelm Schuller, Fort Saskatchewan, Alberta, Canada, and Heinz Keib, Alte Steige, Wertheim am Main, Germany
Filed June 20, 1958, Ser. No. 743,415
Claims priority, application Germany June 21, 1957
7 Claims. (Cl. 18—8)

It is known to produce filaments from glass or other thermoplastic substances by heating rods which are drawn out into filaments by means of a drawing drum.

It is also known to draw off filaments through nozzle orifices from a melting vessel or from a supply or storage vessel, and to wind these filaments on bobbins, or to subject them to further treatment.

The former method affords the advantage of rendering possible the supply of raw material, that is to say the glass rods, in exactly controlled quantities, and to manufacture the glass rods within narrowly limited gauges, and to examine them at any time in a simple manner for accuracy of gauge. It will be readily understood that when rods of an exactly uniform diameter are used as the starting material for the production of filaments, these rods are the most likely ones to produce filaments of an exactly uniform thickness. With the so-called rod process it is, however, considered to be a disadvantage that, after the melting-off operation, the rods of limited length used have to be replaced by fresh rods so that, in view of the clamped portion and other structural facts, there remains a considerable residue of the rod which cannot be used.

The replacement of the rods takes considerable time, and it should be borne in mind that apparatus of normal construction contains more than 100 rods, and that the actual clamping operation always involves the risk of breakage of the tubular rods which are made of brittle material. In these circumstances, it will be obvious that the leftover part of the rods represent a substantial percentage of the material fed to the apparatus.

In order to avoid waste of rod ends, it has previously been proposed to weld the rods freshly fed to the machine to those disposed in the machine. As it was, however, impossible to release the tension of welded position, most of the rods broke at the welded position in the feeding rolls so that in some cases production had to be interrupted for extended periods of time.

Drawing-off filaments from a melting vessel which contains a plurality of nozzle orifices afford the advantage of ensuring a continuous drawing-off operation over a substantial period of time. This method involves, however, a number of disadvantages, the main disadvantage being that it does not produce filaments of uniform thickness both in themselves and relatively to each other. This is due to several reasons, the first being that the liquid glass which is in the hot state and which is drawn off at a high speed, causes enlargement of the orifices after a short time, and moreover it is in practice extremely difficult to produce a uniform temperature over the whole area or surface provided with nozzle orifices and, if pressure is used, it is also difficult to generate a uniform pressure. In addition, it has been found to be disadvantageous to provide at least the base of the melting vessel which is provided with nozzle orifices of a highly heat-resistant material, and experience has shown that practically the only suitable material is the rare and expensive metal platinum. A further disadvantage of such a method is that its continuous operation is virtually obligatory. If the process is stopped, severe difficulties are then encountered. On reheating the vessel or tank to re-start operation, decrystallisation or devitrification occurs with blockage of the nozzles, vets or bushings, so resulting in a further interruption of production.

In accordance with the process of the invention, the disadvantages hereinbefore described are avoided without, however, abandoning the advantage of the so-called "rod-process" referred to, namely the advantage of it being possible to supply the raw material for forming the individual filaments in exactly controlled quantities. It is an object of the invention to provide a process which enables a fully automatic, continuous spinning of glass or other thermoplastic materials from rods, which saves labour and material, and in which the energy required to heat the spinning-off position is fully utilised, inasmuch as this energy is not uselessly radiated when the devices are inoperative as was hitherto the case.

According to the process of the invention, glass or other thermoplastic substances is drawn into fibres the rods being continuously withdrawn from a supply device and, standing end to end loosely one upon the other, are automatically and continuously fed to a bar or other member which may be heated directly and/or indirectly, and in which bar or member the adjusting ends are fused together, and from which positions filaments are simultaneously drawn-off from the glass mass which has been merely converted into the plastic state. Thus by means of a "one-heat" process, fresh rod is joined to a rod from which one or more filaments are being drawn, the joining and drawing processes being effected in the same zone. The temperature of the bar or other member may, for example be maintained in the range 1050°–1100° C.; the bar may, therefore, be constructed of steel. The rods of glass may have a diameter in the range 3.5–6 mm. and the fibres or filaments may, for example, have a diameter in the range 0.008–0.014 mm.

The invention also relates to apparatus for carrying out the process of the invention.

The accompanying drawings show diagrammatically and in substantially simplified form one construction of apparatus for carrying out the process of the invention, and it is with reference to this construction that the process is hereinafter described.

Figure 1:
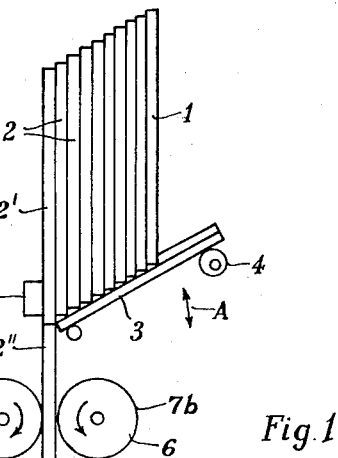
FIGURE 1 shows, on a considerably reduced scale, a side elevation of the apparatus.

1 generally denotes a feed and supply device which, in the construction shown in FIGURE 1 consists of the inclined part 3 on which the rods 2 are received.

As indicated by the double arrow A, a motion may be imparted to the inclined part 3, as for example, by means of a cam 4, in order to ensure continuous supply and close succession of the rods. The foremost rod 2' comes to bear against a stop 5, of suitable construction, which is so adjusted that the rod stands loosely end to end upon the rod 2" below, which is already in the direct feeding position.

Upon descending vertically further down, the rod is engaged by a feeder, generally denoted by 6, to be moved under a slight pressure in the direction of the arrow B. The feeder may, for example, consist of two continuously driven oppositely disposed rollers, pullers or discs 7a and 7b.

The rod is finally passed to a bar 8 which is secured in position, in the frame of the apparatus in any suitable manner, as for example in a supporting bar or strip 9 of fire-clay.

If desired, the rod may first be passed through a cooling device, generally denoted by 10 which may, for example, comprise a guide 11 with water channel 12.

The adjacent rod ends, which hitherto have been standing loosely and separately one upon the other, are fused together in the bar in such manner that the succeeding rod 2" is dipped into the plastic residue 13 into which the preceding rod has been melted as hereinafter described.

It is, therefore, an essential feature of the invention that the glass 13 present in the bores 14 of the bar 8 and used for the melting-off and drawing-off operations, is constantly in a plastic state. To achieve this, the bar 8 is, in accordance with the invention, provided with thermal energy so that the temperature rises over its cross-section throughout from the inlet hole 15 to the outlet 16. This can be achieved in various ways. Thus, for example, the bar may be surrounded by a closely fitting heating coil having various branches which can be controlled by means of a series resistance or rheostat.

Another alternative consists in providing the bar of a cross-section suitable automatically to produce, with uniform heating, the desired distribution of temperature which increases downwardly in the direction of the melting-off position.

Figure 2:
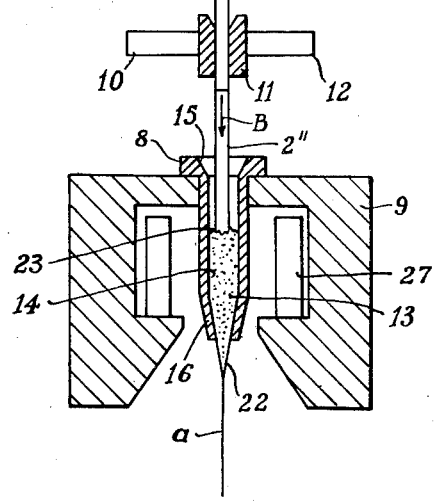
FIGURE 2 shows a substantially full size perspective view of a component of the apparatus of the invention.
Figure 2:
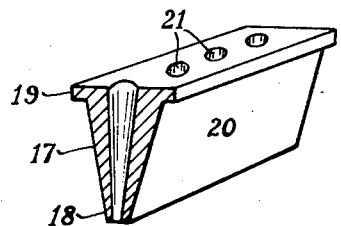

A component of the apparatus according to the invention which is provided in accordance with this principle, is shown in FIGURE 2 in the form of a section of a small block which is used to form a bar, or as a sectional view of a bar as such. It will be noted that the cross-sectional area to be heated is larger at the position 17 than at the position 18, thus resulting in the desired distribution of the temperature. With reference to FIGURE 2, 19 denotes the flange of the small block 20, 21 being the boring provided therein.

A heating device, the distance of which from the bar 8 may be regulated in such manner that the heat of radiation by which the bar is heated decreases upwardly as desired, may be provided at a distance on one or, advantageously, on both sides of the bar 8. This feature of the process is of considerable advantage for the reason that it meets the requirement that the melting-off position—which in FIGURE 1 is denoted by 22—should have a temperature sufficiently high to ensure that the glass is converted into the liquid state necessary to enable the filament $a$ to be drawn-off, while the rod residue 13 in the boring 14 should merely be maintained in a plastic state, in simple manner by means of a single heating device.

Figure 3:
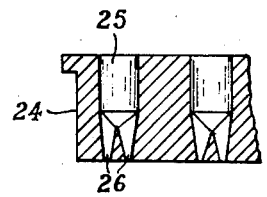
FIGURE 3 shows a substantially full size sectional view of a component of the subject-matter of the invention in a plane at right angles to that shown in FIGURE 1.

It is obvious that to achieve equally effective results, it is not absolutely necessary for the bar to have exactly the cross-sectional shape shown in FIGURE 3; any other shape may be provided, for example, cross-section which decreases downwardly in steps. In accordance with the invention, the inlet diameter 15 (FIGURE 1) of the bore of the bar 8 is only slightly larger than the diameter of the rods 2 supplied. It is thus achieved that, combined with the gradually decreasing temperature in the direction of the inlet hole, the rod fed does not melt-off, but actually dips into the sump of plastic glass formed by the preceding rod. It has been found that, due to the fact that the glass present in the opening 14 is deliberately maintained in a plastic rather than in a liquid state, it is possible to achieve a really homogeneous consolidation between the preceding and the succeeding rods, so that at this position on passing through the outlets of the bars, filament breakages are avoided.

The bores in the bar shown by way of example in FIGURE 3 may be of slightly conical shape. They may, however, be of cylindrical construction, or they may be of the construction shown in FIGURE 1 in which a cylindrical portion merges into a conical portion.

In addition to the fact hereinbefore referred to, namely that the rods are fed individually so that the quantities of glass fed can be exactly controlled, the division of the melting space into a plurality of relatively small individual spaces affords the further advantage that it is possible to maintain the glass mass in each individual bore at exactly the desired temperature at which it is converted merely into a plastic condition.

It will be readily understood from the drawings that the bores are cylindrical or slightly conical, and that the diameter of their outlet is relatively large. This facilitates the issuing of the glass mass 13 which at this position is still in a plastic state and which is only subsequently converted into the liquid state at the position 22 at which the filament is drawn-off. This affords, however, the substantial additional advantage that in practice there is no danger of blocking or obstruction of the relatively large orifices. In known devices provided with supply vessels which contain a liquid glass mass it has been the blocking or obstruction of the nozzle orifices which has been one of the main sources of trouble.

A further development of the invention is the possible alternative construction of the bar or block shown in FIGURE 3. In this construction, the bar 24 presents cylindrical bores 25 which merge into two or more cylindrical or conical bores 26. It is thus possible to draw-off two filaments simultaneously from each rod fed, so that the continuous spinning process of the invention is rendered even more commercially advantageous.

If the bar is heated directly, it may be of advantage for it to be made in one piece; it may, however, also be divided into several individual blocks, advantageously of uniform size. In addition to affording the advantage of a simpler replacement by which material is saved, for example during the cleaning or replacement of damaged parts, this construction also affords the advantage of providing an exact spacing of the holes by simple means. To gain a clear understanding of this problem, it should be understood that the rods 2 are fed in the cold state in exactly spaced relation, whereas the bar into the openings of which they are dipped, is in a warm state. When, for example, the lateral spacing between the rods is 10 mm., then the bores have to be drilled at a 9.8 mm. spacing to ensure that, after heating and expansion of the bar, the holes have the required 10 mm. spacing. If the heating of the bar over its entire length is not exactly uniform as may, for example, happen when the heater is of uneven construction or if the heater is not disposed in an exactly parallel position, then slight spacing faults or errors caused by an uneven heating of the bar may be more readily removed if individual blocks are provided, whereas when a single bar is provided, difficulties may arise in this respect due to the fact that such spacing errors may add up.

Heating devices of widely varying kinds may be used for the direct or indirect heating of the bar 8, and of the plastic glass mass 13 and of the spinning-off position 22. The heating device shown in FIGURE 1 consists of rods or bars 27 and is inserted in the supporting strip 9; similarly operating devices such as heating coils or the like are, however, equally suitable.

Among other advantages, the following advantages may be achieved by the process of the invention using the apparatus described for carrying out the process:

(1) The continuous feeding of raw material, which consists of rods, enables the spinning-off operation to be continuous and eliminates the necessity of having to replace old rod residues by fresh rods. A considerable economy in labour, working time and materials is thus achieved.

(2) At the positions at which the glass mass contacts the apparatus directly, it is heated to a softening or plasticising temperature which is just sufficient to allow the material to issue from the orifice. This enables the components of the apparatus to be made of a material which need not be as highly heat-resistant as the expensive material.

(3) The high temperatures are applied at those positions at which the glass mass is not in direct contact with parts of the apparatus, and at which constant dissipation of heat by the surrounding air is assured.

(4) In view of the relatively large orifices provided, blocking or obstruction thereof is substantially avoided. The diameters of the bores or orifices may, for example, be 3–4 mm., which is considerably greater than the diameter of the nozzle or bushings employed in those processes employing a vessel or tank containing molten glass. Furthermore, the quantity of glass retained in the bores or orifices is very small, for example 5–15 grams, and such a quantity is used up in a matter of minutes upon re-starting the process after an interruption.

(5) As the temperature need not be as high as to maintain the whole glass mass constantly in the liquid state, the expenditure in energy and dangerous devitrification of the glass are avoided.

(6) The part which contains the plastic glass mass may be divided into a plurality of small subsidiary units, so that cooling, cleaning and replacement are facilitated.

(7) Feeding of the rods individually renders it possible for the glass mass always to be fed to the spinning-off position in exactly controlled quantities, so that the diameter of the filaments is maintained with the greatest precision.

We claim:

1. A method for the production of filaments from rods of thermoplastic materials including the steps of continuously supplying rods of thermoplastic materials, loosely positioning said rods in vertical disposed abutting end-to-end relationship, feeding such individual rods seriatum into the inlet end of an associated tapered steel boring, applying heat to said boring to cause rods fed thereto to be heated to a plastic mass in said boring, maintaining said heat below the melting point of steel advancing the leading end of successive rods continuously into the plastic mass of its predecessor in said associated boring, extruding said plastic mass from its associated boring at a uniform rate by the advance of successive rods into the said boring, selectively controlling the heat applied to said boring including heating the mass in said boring to the temperature for maintaining it in a plastic state and below the melting point of said steel boring while heating the extruded mass issuing from said boring to the temperature for converting it to a liquid state and drawing off filaments from said extruded liquified mass.

2. The method according to claim 1 including the steps of cooling the rods prior to feeding into the inlet end of said boring and sub-dividing the plastic mass in each boring into at least two extrusion paths.

3. Apparatus for the continuous production of filaments from rods of thermoplastic materials comprising in combination a rod storage member, said member supporting said rods in generally vertical disposition, means operatively associated with said storage member for continuously positioning rods in vertically disposed abutting end-to-end relationship, means for advancing individual abutting rods vertically downward away from said storage member, a rod-heating device having a number of bores formed therethrough, the inlet sections of said bores being formed slightly larger in diameter than said rods, means admitting rods into said bores, the number of said bores corresponding to the number of rods being supplied to said heating device, means for selectively heating said bores to cause rods fed thereto to be heated to a plastic mass in their associated bores, the advancement into said bores of successive rods into the plastic mass of its predecessor in said bore effecting uniform extrusioin of said plastic mass from the outlet section of its associated bore, said means for selectively heating said bores including heat means for maintaining the mass in said bores in plastic condition while converting the extruded plastic mass issuing from said bores into a liquid state from which filaments are drawn.

4. The invention as defined in claim 3 including means for cooling said rods prior to their entry into their respective bores.

5. The invention as defined in claim 3 wherein said rod storage member includes an inclined surface and said means for positioning rods comprises means mounting said inclined surface for undulating movement, and cam means for effecting timed undulating movement of said inclined surface whereby rods are individually advanced and positioned for movement into their associated bores.

6. The invention as defined in claim 3 wherein said heating device is formed with a cross-sectional heated area tapering from the inlet section thereof toward the outlet section thereof for effecting the selected heat distribution.

7. The invention as defined in claim 3 wherein each of said outlet sections is divided into at least two extrusion sections and wherein said selective heating means includes a radiant heater element for effecting the desired temperature distribution.

References Cited in the file of this patent

UNITED STATES PATENTS

| 1,228,495 | Tanzi | June 5, 1917 |
|---|---|---|
| 1,857,791 | Peiler | May 10, 1932 |
| 2,286,653 | Siegfried | June 16, 1942 |
| 2,495,956 | Cook | Jan. 31, 1950 |
| 2,605,502 | Culpepper et al. | Aug. 5, 1952 |
| 2,657,428 | Upton | Nov. 3, 1953 |
| 2,696,285 | Zenlea | Dec. 7, 1954 |
| 2,710,712 | Friedman | June 14, 1955 |
| 2,755,506 | Weber | July 24, 1956 |
| 2,922,187 | Young et al. | Jan. 26, 1960 |

FOREIGN PATENTS

| 52,224 | France | June 21, 1943 |
|---|---|---|
| 884,733 | France | May 3, 1943 |
| 156,202 | Great Britain | July 14, 1921 |
| 452,810 | Great Britain | Aug. 31, 1936 |
| 605,001 | Great Britain | July 14, 1948 |